(12) United States Patent
Sako (10) Patent No.: US 6,552,532 B1
(45) Date of Patent: Apr. 22, 2003

(54) DISPLACEMENT DETECTOR WITH RELATIVELY MOVABLE MAGNET AND SENSOR

(75) Inventor: Hidetoshi Sako, Tsuyama (JP)

(73) Assignee: Next Corporation, Tsuyama (JP)

( * ) Notice: Subject to any disclaimer, the term of this patent is extended or adjusted under 35 U.S.C. 154(b) by 0 days.

(21) Appl. No.: 09/720,749

(22) PCT Filed: Jul. 12, 1999

(86) PCT No.: PCT/JP99/03778

§ 371 (c)(1),
(2), (4) Date: Dec. 29, 2000

(87) PCT Pub. No.: WO00/05548

PCT Pub. Date: Feb. 3, 2000

(30) Foreign Application Priority Data

Jul. 24, 1998 (JP) .............................. 10-225233

(51) Int. Cl.⁷ .............................. G01B 7/00; G01B 7/30; G01D 5/14; G01D 5/245
(52) U.S. Cl. .............................. 324/207.2; 324/207.12; 324/207.24; 324/207.25
(58) Field of Search ............ 324/207.12, 207.2–207.25, 324/251, 252; 73/DIG. 3

(56) References Cited

U.S. PATENT DOCUMENTS 6,253,460 B1 * 7/2001 Schmitz ............. 324/207.22 X

FOREIGN PATENT DOCUMENTS

| GB | 2106651 | * 4/1983 | ............ 324/207.22 |
| JP | 61-134601 | * 6/1986 | .............. 324/207.2 |
| JP | 64-9302 | * 1/1989 | ............ 324/207.22 |
| JP | 6-66508 | 3/1994 | |
| JP | 10-122807 | 5/1998 | |

* cited by examiner

Primary Examiner—Gerard R. Strecker
(74) Attorney, Agent, or Firm—Armstrong, Westerman & Hattori, LLP (57) ABSTRACT

A magnetic sensor having a simple structure and high accuracy for detecting a linear or angular displacement thereof. A magnetic plate with tapered thickness is magnetized in a direction perpendicular to its surface. A magnetic sensor is arranged so that it can move in the direction of the taper of the plate thickness. A drive mechanism for this magnetic sensor is movable with an object to be detected, and the output of the magnetic sensor indicates the displacement.

11 Claims, 8 Drawing Sheets

DISPLACEMENT DETECTOR WITH RELATIVELY MOVABLE MAGNET AND SENSOR

TECHNICAL FIELD

This invention relates to a detector for detecting a mechanical displacement such as a linear displacement or a rotation angle, and more particularly to, a detector of this kind of detector utilizing magnetism.

BACKGROUND ART

There exists a mechanical detector for detecting a mechanical displacement. In the mechanical detector, the whole parts from a moving part which moves corresponding to an object to be detected to a displaying member as a pointer are connected to each other by mechanical parts. However, this kind of mechanical means is complex in structure, and lacks durability because of an abrasion of the inner mechanisms due to their use. Thus, a non-mechanical displacement detector, such as an optical type detector, an electrical type detector and a magnetic type detector, has been used.

In the optical type detector, a light emitting element and a light receiving element are disposed so as to face each other, and a circular plate having a slit is disposed between the light emitting element and the light receiving element so that the circular plate can rotate. A displacement is converted into pulse signals generated by the rotation of the circular plate to count the number of the pulse signals which represent a displacement amount. However, since users wish to set the relationship between one pulse interval and the displacement amount, it is required to prepare various circular plates each having a slit to cope with various requirements of such users, which does not meet a mass production.

The electric type detector includes an electrostatic type detector and a potentiometer type detector. The electrostatic type detector is, in a word, a kind of variable capacitor which requires an operation for balancing an alternating-current bridge. Thus, the electrostatic type detector is not practical. On the other hand, in the potentiometer type detector, since the influence due to an abrasion of a sliding resistance is larger than the influence due to an abrasion in a pure mechanical device, the potentiometer type detector is unstable and lacks durability.

In the magnetical type detector, a distance between a pole of a permanent magnet and a magnetic sensor is changed and the linear range of the relationship between the displacement and the output of the magnetic sensor is narrow. For example, in a case where an output of the magnetic sensor is obtained by rotating a magnet in accordance with a displacement, the output varies in the form of a sine curve. Therefore, the measuring range is limited within approximately ±45 degrees if the linear range of the sine curve is utilized.

DISCLOSURE OF THE INVENTION

The present invention belongs particularly to a non-mechanical displacement detector utilizing magnetism among the aforementioned non-mechanical type detectors. The present invention is to provide a displacement detector which solves problems of the aforementioned conventional devices and has characteristics that the displacement detector is simple, stable and endurable, and can output various types of signals, including analog and/or digital signals.

According to the present invention, a magnetic plate having a thickness which changes along a single line in accordance with the distance from one end of the magnetic plate, i.e., a magnetic plate with tapered thickness, is magnetized in a direction of its thickness. A magnetic sensor is disposed near the surface of the magnetic plate so that it can move relative to the magnetic plate in the tapered direction of the plate thickness while keeping a constant distance therebetween, to detect the magnetic field strength on the surface of the magnetic plate. A drive mechanism for conducting the aforementioned relative movement of the magnetic sensor and the magnetic plate is set such that the drive mechanism moves in accordance with the movement of an object to be detected. The magnetic sensor outputs a displacement detect signal.

The aforementioned "single line" used in the sentence, "a magnetic plate having a thickness which changes along a single line in accordance with the distance from one end of the magnetic plate," denotes a straight or circular line. The aforementioned "relative movement of the magnetic sensor and the magnetic plate in the tapered direction of the plate thickness" denotes a linear displacement or a rotational displacement along the aforementioned line.

Furthermore, a correction means for correcting a change of magnetic force and output of the magnetic sensor due to temperature change is provided in the aforementioned device. This means includes a temperature correction means for conducting temperature correction by comparing an output of one or a plurality of magnetic sensors fixed to the magnetic plate with a reference value or utilizing a relationship between the outputs, a temperature correction means for conducting a temperature correction by utilizing an output of a magnetic sensor disposed so as to touch a magnet disposed apart from the magnetic plate, and a temperature correction means for conducting a temperature correction by utilizing an output of the magnetic sensor, which is movable relative to the magnetic plate, at a predetermined position.

BRIEF EXPLANATION OF THE DRAWINGS

FIGS. 1(A), 1(B), and 1(C) show an embodiment of the present invention, wherein

PREFERRED EMBODIMENTS OF CARRYING OUT THE INVENTION

Figure 1A:
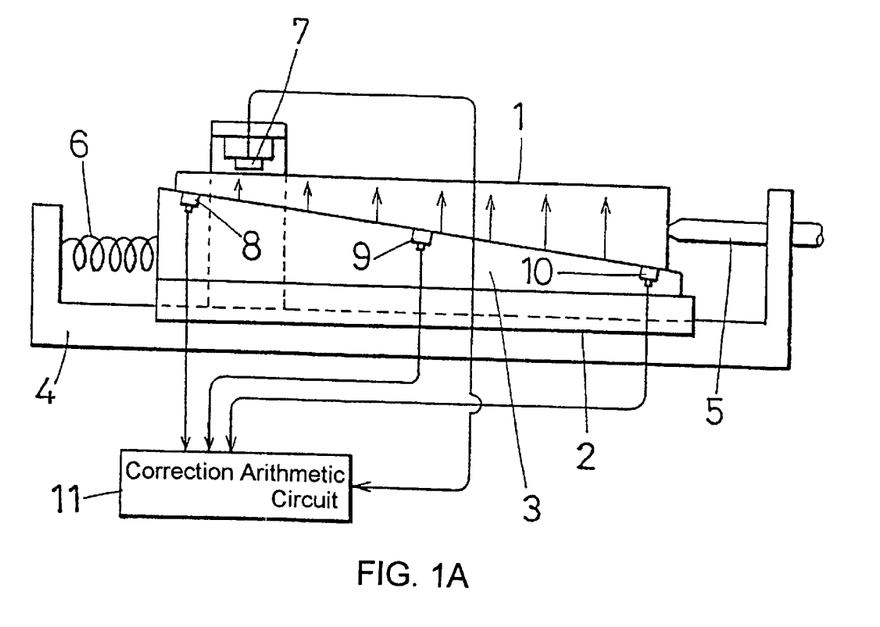
FIG. 1(A) is a whole view.
Figure 1B:
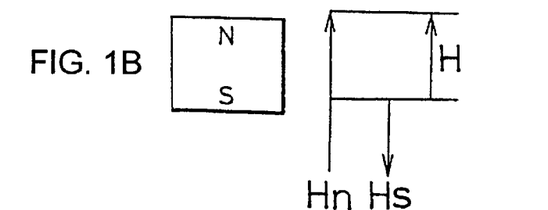
FIG. 1(B) is a cross-sectional view of a magnetic plate.
Figure 1C:
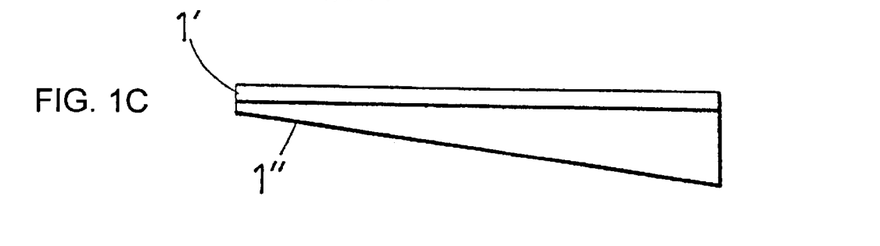
FIG. 1(C) is a side view showing a different structure of a magnetic plate.
Figure 2:
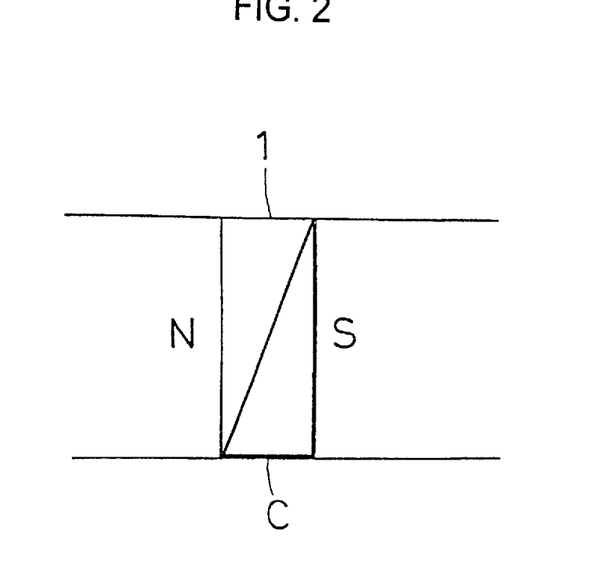
FIG. 2 is an explanatory view showing a method for magnetizing a magnetic plate.

In FIG. 1, the reference numeral 1 denotes a magnetic plate whose thickness decreases linearly from one end towards the other end to have a tapered lower surface. This magnetic plate 1 is magnetized evenly as shown by arrows in FIG. 1. The magnetic plate 1 may be made of magnetic alloy, ferrite or magnetic plastic. In order to magnetize the magnetic plate, as shown in FIG. 2, for example, a magnetic plate 1 to be magnetized and a supplement magnetic plate C having the same taper and the same magnetic characteristic as those of the magnetic plate 1 are coupled so as to compensate their thickness and disposed between the magnetic poles N, S of a magnetizing device so as not form a gap therebetween. By magnetizing the magnetic plates having the same characteristic and the same configuration while coupling to each other so as to compensate their thickness, every portion of the coupled plates is evenly magnetized, and the magnetized status will be maintained even after the detachment of these magnetic plates. The supplement magnetic plate C magnetized as in the magnetic plate 1 may also be used in a displacement detector. Besides the above, in a case where plastic magnetic materials are molded to form a predetermined configuration, by applying a magnetic field from outside the metal mold, the materials are magnetized and a molecular orientation will occur. Therefore, after detaching the molded article from the mold, the molded article may be used as it is. If the molded article is magnetized again, an even magnetization is achieved without using a supplementary magnetic plate in a gap because the molecules are orientated. By instantaneously magnetizing a magnetic plate by using a magnetizing coil with a hollow core by passing a high-current through the magnetizing coil, a magnetic plate can be magnetized evenly without coupling it to a supplemental magnetic plate or a magnetic materials having the same configuration as the magnetic plate. The magnetic plate 1 may be formed by adhering an evenly magnetized magnetic plate 1' having a constant thickness onto a tapered magnetic plate 1". The reference numeral 2 denotes a slide for supporting the magnetic plate 1, and is made of non-magnetic materials. A spacer 3 of non-magnetic materials is placed between the magnetic plate 1 and the slide 2 so that the upper surface of the magnetic plate 1 becomes parallel to the slide 2. The slide 2 is disposed on a base plate 4 which also guides the slide 2 so that it slidably moves rightward and leftward. Provided at the right end of the base plate 4 is an actuator 5 which abuts against an object the displacement of which is to be detected. The actuator 5 is pushed rightward by a spring 6 provided at the left end of the base plate 4. The reference numeral 7 denotes a magnetic sensor made of a Hall element. The magnetic sensor 7 is disposed adjacent to the magnetic plate 1 so as not to move relative to the base plate 4. The magnetic sensor 7 detects the magnetic field strength above the magnetic plate 1. The output of the sensor 7 depending on the magnetic field strength represents a displacement amount of the object to be detected.

Figure 3:
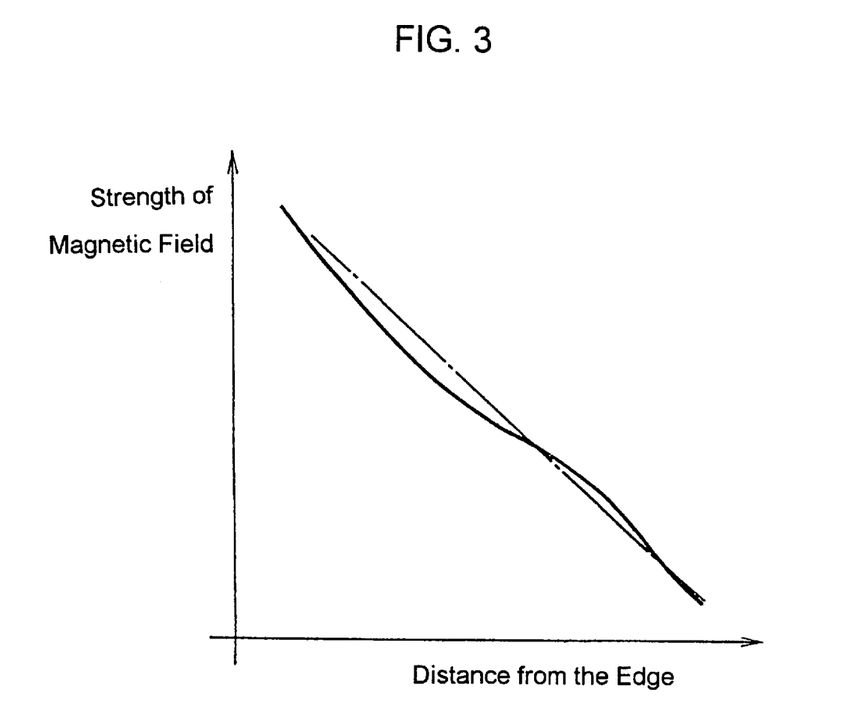
FIG. 3 is an example of a graph showing a magnetic field strength distribution on a surface of a magnetic plate.

In the present invention, the reason why the magnetic field strength on the surface of the magnetic plate with a gradually changed thickness changes depending on the thickness of each portion of the magnetic plate, is considered as follows. FIG. 1(B) shows a cross sectional view of the magnetic plate 1. The magnetic field strength above the magnetic plate will be considered in a case where the upper surface and lower surface are magnetized as N pole and S pole, respectively, as shown in FIG. 1(B). In this case, the magnetic field strength H is represented by an overlap of the magnetic field Hn generated by the magnetic charges on the upper surface and the magnetic field Hs opposite to the magnetic field Hn. Since Hs and Hn are opposite in direction, H is represented by H=Hn−Hs. H is weaker than a field strength Hn that can be obtained by disposing a magnetic extension member U (not shown) below the lower surface so as to move the lower magnetic charges farther from the upper magnetic charges. Since this self-demagnetization effect becomes stronger as the thickness of the magnetic plate 1 becomes thinner, it may be considered that the magnetic field strength above the magnetic plate 1 decreases from the right end towards the left end in FIG. 1(A). Our experiment revealed that the decrease of the magnetic field strength is practically considered to be linear as shown in FIG. 3. In the present invention, by utilizing the above-mentioned fact, the magnetic sensor 7 is moved above the magnetic plate 1 relative to the magnetic plate 1, to thereby detect the amount of movement in accordance with the detected magnetic field strength. In the embodiment shown in FIG. 1, the magnetic plate 1 is moved because the fixation of the magnetic sensor 7 has structural advantages since the magnetic sensor 7 is to be connected to an amplifier, a correction circuit and the like. The whole device shown in FIG. 1 is stored in a case made of magnetic materials. This case becomes a part of magnetic circuit through which the magnetic field generated by the magnetic plate 1 passes. However, the main effects of this case is to cut off an outer magnetic field. Needless to say, in a case where there is no effect of the outer magnetic field, the case may be made of non-magnetic materials.

In FIG. 1, the reference numerals 8, 9 and 10 denote Hall elements of magnetic sensor for temperature correction, which is fixed on the lower surface of the magnetic plate 1. Each of the Hall elements detects the magnetic field strength generated by the magnetic plate at the respective positions. The outputs of the Hall elements are inputted into the correction arithmetic circuit 11 to correct the output of the magnetic sensor 7. This is to correct the magnetic field strength generated by the magnetic plate 1 which varies depending on the temperature. The magnetic field strength detected by the magnetic sensor 7 and that detected by the Hall elements change at the same rate. Therefore, the correction can be performed by multiplying the average of the ratio of the output of the magnetic sensor 8, 9, 10 to the reference value previously set to each sensor by the output of the magnetic sensor 7. Alternatively, by using only both the magnetic sensors 8 and 10, the displacement may be represented by an output obtained by dividing the difference between the outputs of the magnetic sensors 7 and 8 by the difference between the outputs of the magnetic sensors 10 and 8.

The magnetic sensors 8, 9 and 10 can also be used for a correction in a case where the variation of the magnetic field strength on the magnetic plate 1 is not strictly linear. In this case, a function equation showing a distribution curve of the magnetic field strength on the surface of the magnetic plate 1 is obtained based on the outputs of the total of three magnetic sensors 8, 9 and 10 or the total of five magnetic sensors, the above three magnetic sensors and additional two magnetic sensors disposed therebetween, and saved in a memory. Then, a positional data corresponding to the output of the magnetic sensor 7 can be obtained from the aforementioned function equation. The function equation may be, for example, a cubic equation. In a case where a temperature correction is also performed, the aforementioned temperature corrected output of the magnetic sensor 7 is compared with the function equation. In this embodiment, there are three magnetic sensors 8, 9, 10. However, a single magnetic sensor may be enough for the temperature correction.

Correction of a non-linear change of the magnetic field strength may be performed, without using a plurality of magnetic sensors as mentioned above, by utilizing a function equation obtained by actually measured surface magnetic field after the magnetization of the magnetic plate 1 and saved in a memory. Alternatively, such a correction may be performed by utilizing a correction function or a table prepared based on a correction test of the displacement detector as a finished product.

Figures 4A, 4B:
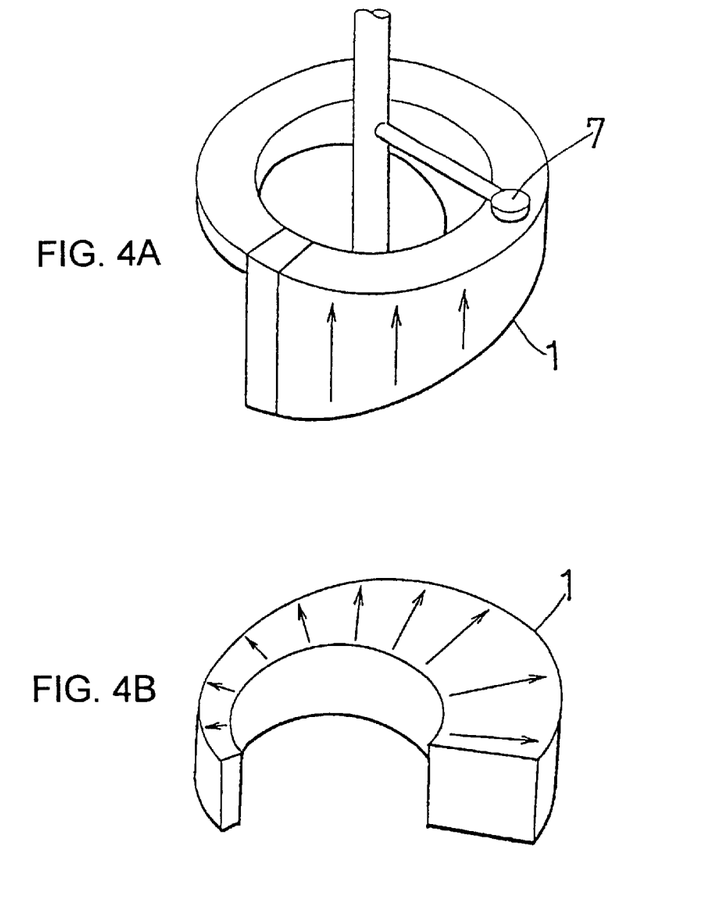
FIGS. 4(A), 4(B), and 4(C) are perspective views showing an embodiment for detecting an angular displacement.
Figure 4C:
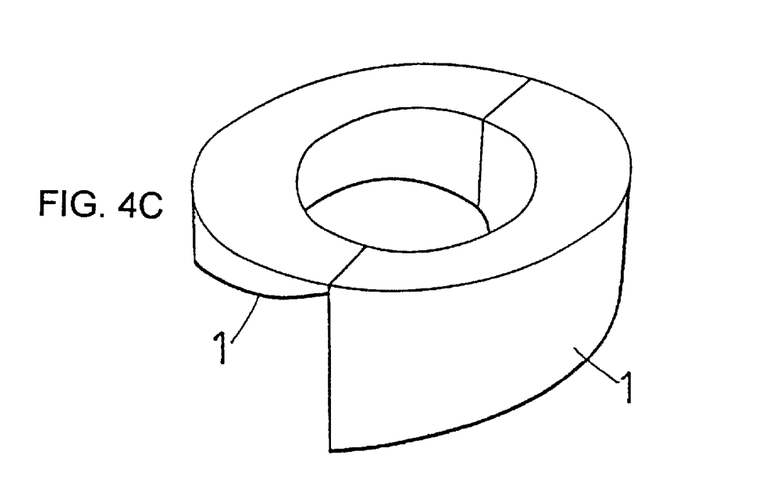

FIGS. 4(A) and 4(B) show embodiments of circular magnetic plates 1. In these embodiments, a magnetic sensor 7 rotates relative to the magnetic plate 1 about the center of the circle. The axis of rotation is connected to an axis of rotation of an object to be detected, to detect the angle or direction of rotation of the object. Especially, FIG. 4(B) shows an embodiment of a radially magnetized semi-circular magnetic substance having a thickness changing in the radial direction. If the complete circular shaped magnetic plate 1 is formed by a single magnetic member for the purpose of covering the 360° detection range or the similar range, both ends of the magnetic plate are closely disposed, causing a disordered magnetic field. Therefore, as shown in FIG. 4(C), it is preferable that two semi-circular magnetic plates are coupled each other.

Figure 5:
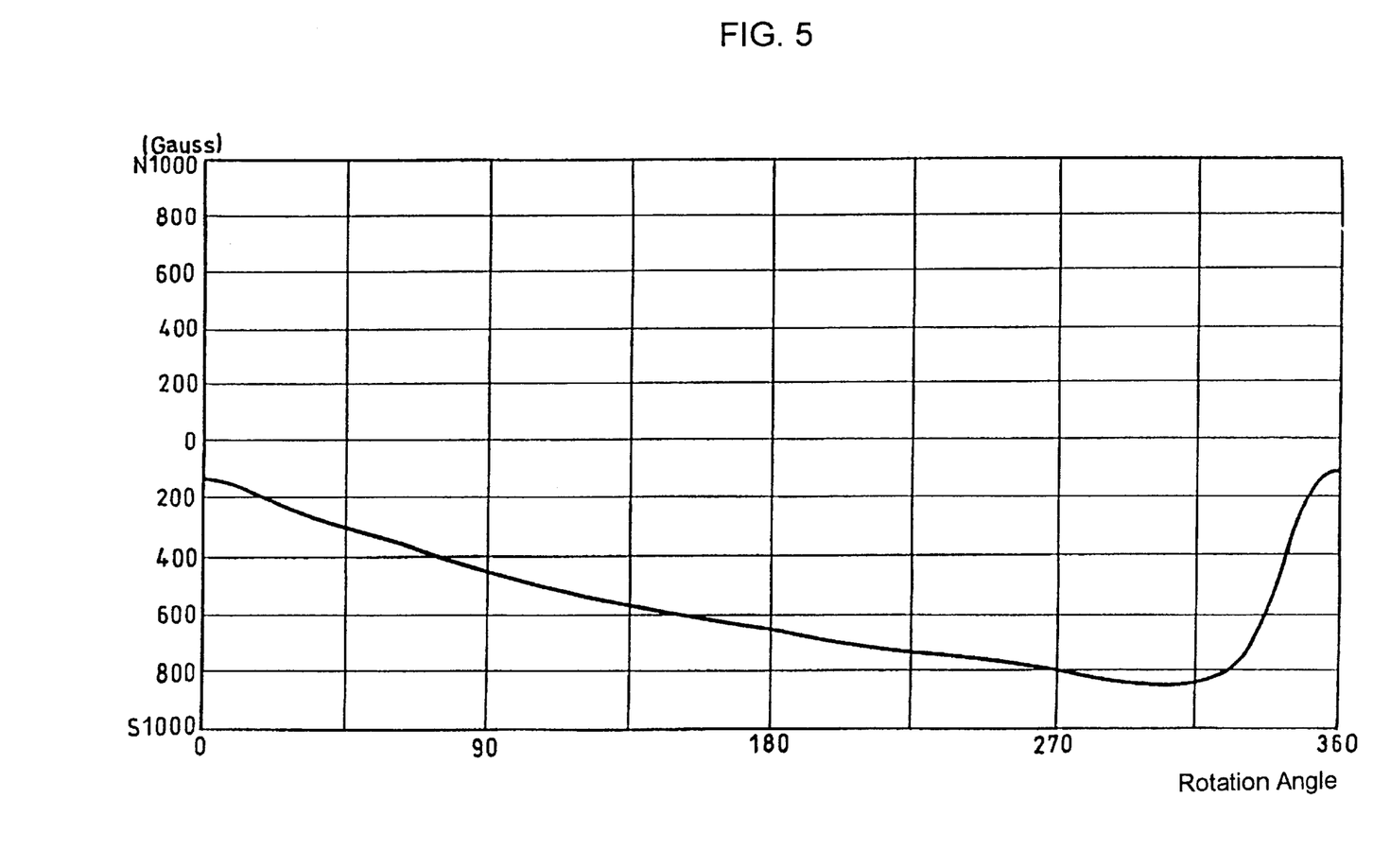
FIG. 5 is a graph showing a surface magnetic field strength of a circular magnetic plate.

In the embodiment shown in FIG. 1, the magnetic plate 1 has a width of 6 mm, an effective length of 20 mm, a thickness of the thinnest portion of 0.5 mm and a thickness of the thickest portion of 4.0 mm. The gap between the upper surface of the magnetic plate 1 and the magnetic sensor 7 is 0.6 mm. Further, in a case of a magnetic plate 1 shown in FIG. 4A having an external diameter of 9 mm, an internal diameter of 2 mm, a thickness of the thinnest portion of 0.8 mm and a thickness of the thickest portion of 3.1 mm, the result of the surface magnetic field strength (gauss) after the magnetization is shown in FIG. 5. A magnetic plate has a good repeatability of a relationship between a position on a surface of the magnetic plate and a magnetic field strength even in a case of a linear-shaped or a circular-shaped magnetic plate. Accordingly, instead of linearly changing the taper of thickness, an appropriate non-linear shape may be employed so that the surface magnetic field strength linearly changes depending on a displacement along the surface of the magnetic field plate.

Figure 6A:
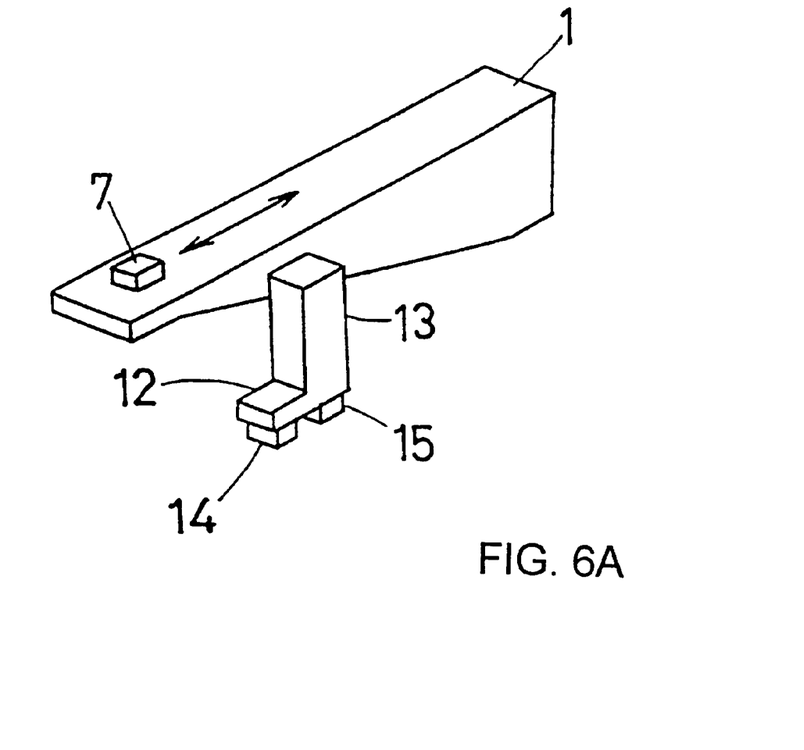
FIGS. 6(A) and 6(B) are perspective views showing another embodiment of a correction method against a temperature change.

FIG. 6 shows a temperature correction method different from the embodiment shown in FIG. 1. In FIG. 6(A), magnets 12 and 13 are disposed beside the magnetic plate 1. The magnet 12 has the same height as the thickness at the thinnest portion of the magnetic plate 1, and the magnet 13 has the same height as the thickness of the thickest portion of the magnetic plate 1. Both the magnets 12 and 13 are integrally formed to have an L-shape as a whole, and magnetized evenly in the direction of height to have the same magnetic field strength as that of the magnetic plate 1. Magnetic sensors 14 and 15 are adhered on the lower surfaces of the magnets 12 and 13, respectively. Functionally, the magnetic sensor 14 corresponds to the magnetic sensor 8 shown in FIG. 1, and the magnetic sensor 15 is the same as the magnetic sensor 10 shown in FIG. 1. In other words, the ratio of the output difference between the magnetic sensors 7 and 14 to the output difference between the magnetic sensors 15 and 14 corresponds to the displacement amount.

Figure 6B:
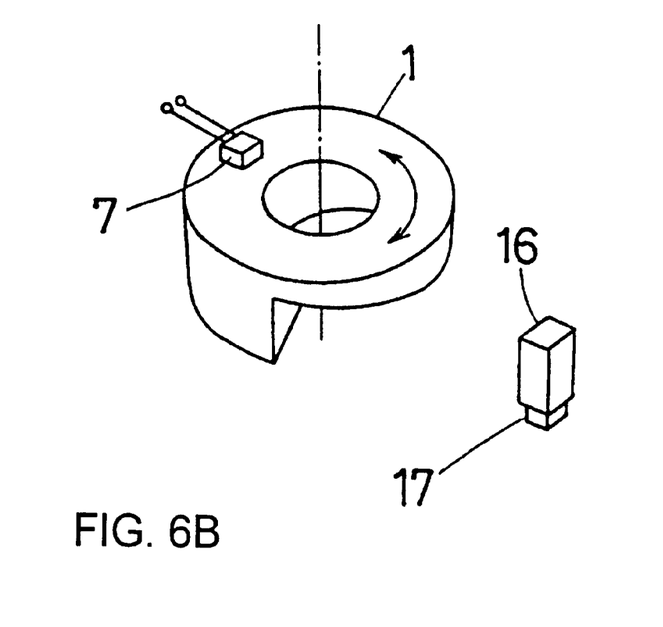

FIG. 6(B) shows an embodiment including a magnetic plate 1 and a single magnet 16 to which a magnetic sensor 17 is adhered. The output of the magnetic sensor 17 is compared with a reference value to obtain a ratio thereof, and the ratio is multiplied by the output of the magnetic sensor 7 to perform a correction against a temperature.

Figure 7:
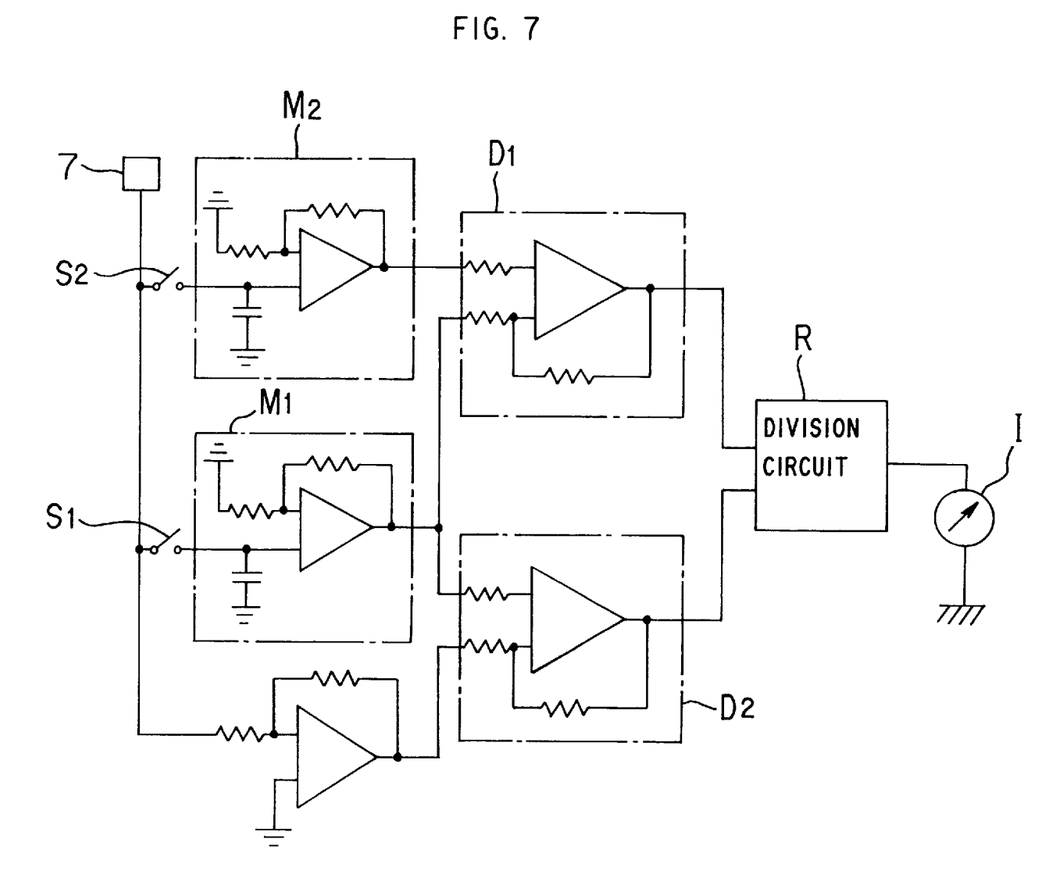
FIG. 7 is a circuit diagram of one example of a circuit used in the present invention.

A correction against a temperature can be performed by utilizing only a magnetic plate 1 and a magnetic sensor 7 movable relative to the magnetic plate 1, without utilizing the magnetic plate 1 and other magnet, or a magnetic sensor 7 and other magnetic sensor. In this case, the outputs of the magnetic sensor 7 when the magnetic sensor is located at the thinnest portion of the magnetic plate 1 and the thickest portion thereof in FIG. 1 are saved, and the saved data are used similar to the output of the actuator 5 shown in FIG. 1. According to this method, the actuator 5 shown in FIG. 1 is placed at the position of zero displacement, and the output of the magnetic sensor 7 at that time is saved in a first memory means. Then, the actuator 5 is placed at the position of maximum displacement, and the output of the magnetic sensor 7 is saved in a second memory means. Thereafter, the actuator 5 is placed so as to touch an object to be detected, to obtain an output of the magnetic sensor 7. Then, these three data are inputted into an arithmetic circuit. FIG. 7 shows an embodiment of the circuit. In this embodiment, an analog memory circuit is used as each of two memory means.

The switch S1 is closed when the actuator 5 is located at the position of zero displacement. The reference numeral S2 denotes a switch which is closed when the actuator 5 is located at the position of maximum displacement. The positions of the actuator are determined by stoppers against which a part of the actuator butts. The output of the magnetic sensor 7 is inputted into the analog memory circuit M1 or M2 via the switch S1 or S2, and the output of the magnetic sensor 7 at the time of the opening of the switch S1 or S2 is stored in the analog memory circuit M1 or M2. The outputs of the memory circuits M1 and M2 are inputted into a subtraction circuit D1. The output of the circuit D1 is inputted into a divisor input terminal of a division circuit R, and the output of the magnetic sensor located at any position is inputted into a dividend input terminal of the division circuit R. A signal showing the position of the actuator 5 can be obtained from the division circuit R, and can be shown on a display I as a displacement. The division circuit has been provided as an IC. However, the circuit may be constituted such that the outputs of the subtraction circuits D1 and D2 are inputted into logarithm conversion circuits each utilizing an exponential function characteristics of pn junction, respectively, the output of each logarithm conversion circuits is inputted into a third subtraction circuit, and the output of the third subtraction is reverse logarithmic transformed by a reverse-logarithmic transformation circuit. The circuit shown in FIG. 7 can also be applied to the embodiments shown in FIGS. 1 or 6 by deleting the switches S1 and S2 and memory circuits M1 and M2 shown in FIG. 7 and directly inputting the output of the magnetic sensors 8 and 10 (FIG. 1) or the output of the magnetic sensors 14 and 15 (FIG. 6) into the subtraction circuit D1 (the right side of the subtraction circuit D1 remains as it is). However, a circuit processing the outputs of the magnetic sensors 7, 8, 9, 10, 14, 15 and 17 may be an analog type or a digital type.

In the meantime, the correction against the temperature change may be performed by comparing the output of the magnetic sensor 7 (a magnetic sensor linked with the actuator 5) located not at specified plurality of positions of the magnetic plate 1 but at a specified single position of the magnetic plate 1 with a reference value to obtain a ratio, and multiplying the ratio by the output of the magnetic sensor located at any position.

The correction against a temperature change may be performed by utilizing temperature characteristics of a thermistor or a semi-conductor circuit element in the circuit processing the outputs of the magnetic sensors 7, instead of utilizing the magnetic plate 1 or a magnet showing the same temperature characteristics as that of the magnetic plate 1 mentioned above.

INDUSTRIAL APPLICABILITY

Figure 8:
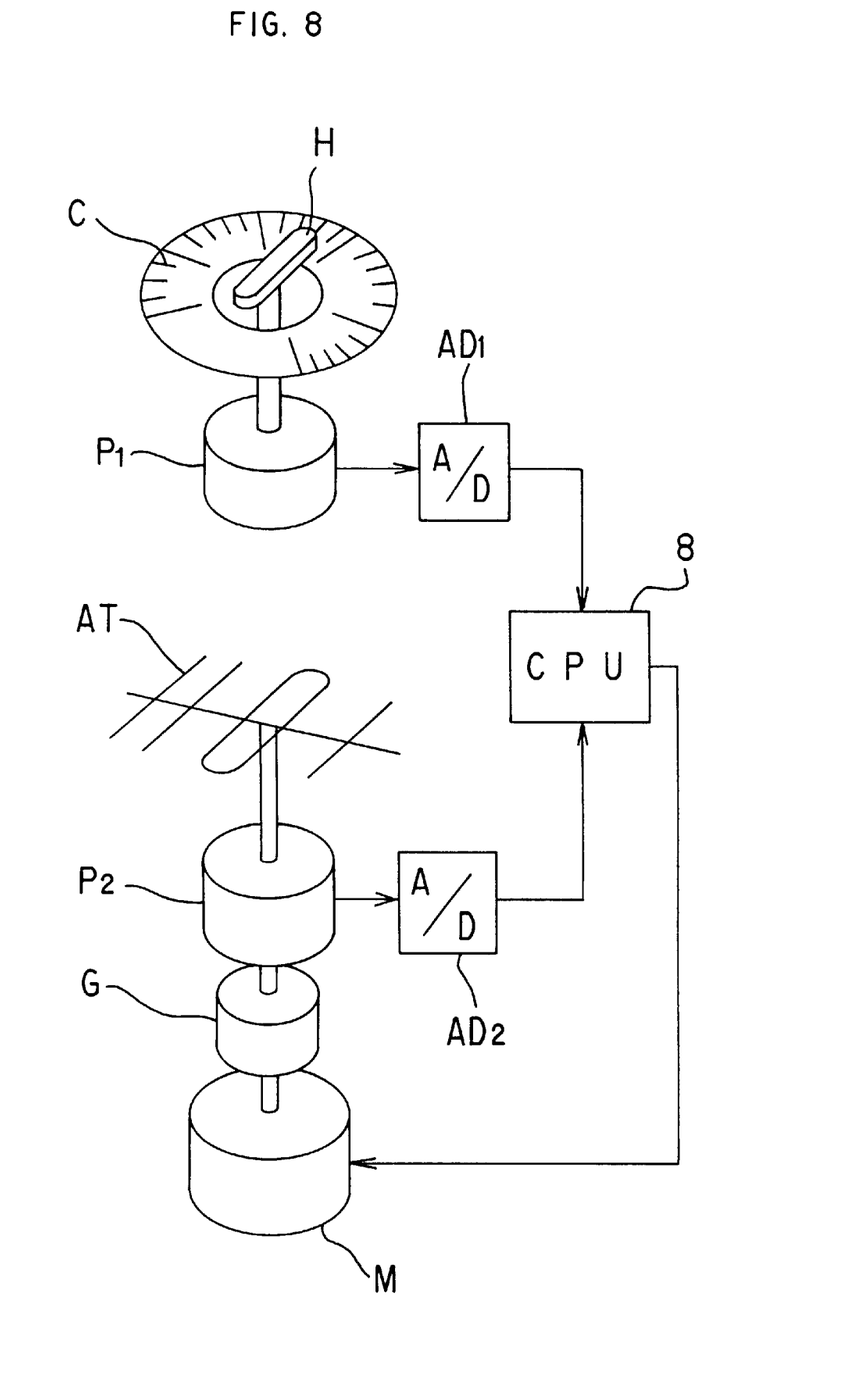
FIG. 8 is a block diagram of a modified embodiment of a device according to the present invention.

FIG. 8 shows a block diagram showing the whole structure of a device in which the present invention is applied to a rotational angle transmission device. In FIG. 8, P1 denotes a device according to the present invention. The device is of a type utilizing a circular magnetic plate 1. The output of the device P1 is a signal of an angular position corresponding to the output of the reverse logarithmic transformation circuit of the circuit shown in FIG. 7. H denotes a handle by which the angular position can be visually confirmed by the scale on the scale plate C. The signal of the angular position is outputted from the device P1. The device P2 is the same as the device P1. In this case, the device P2 is connected to the pole of the antenna AT, and a signal of rotation angle of the pole is outputted from the device P2. This embodiment is intended to adjust the direction of the outdoor antenna from indoor. The pole of the antenna AT is driven by a pulse motor M. G denotes a reduction gear which transmits the rotation of the pulse motor M to the antenna pole at a reduced speed. The outputs of the devices P1 and P2 are inputted into the CPU 8 via the A/D converters AD1 and AD2. The CPU 8 compares these two inputs, and then outputs a driving pulse to the pulse motor M so that the output of AD2 becomes equal to the output of AD1.

Figure 9:
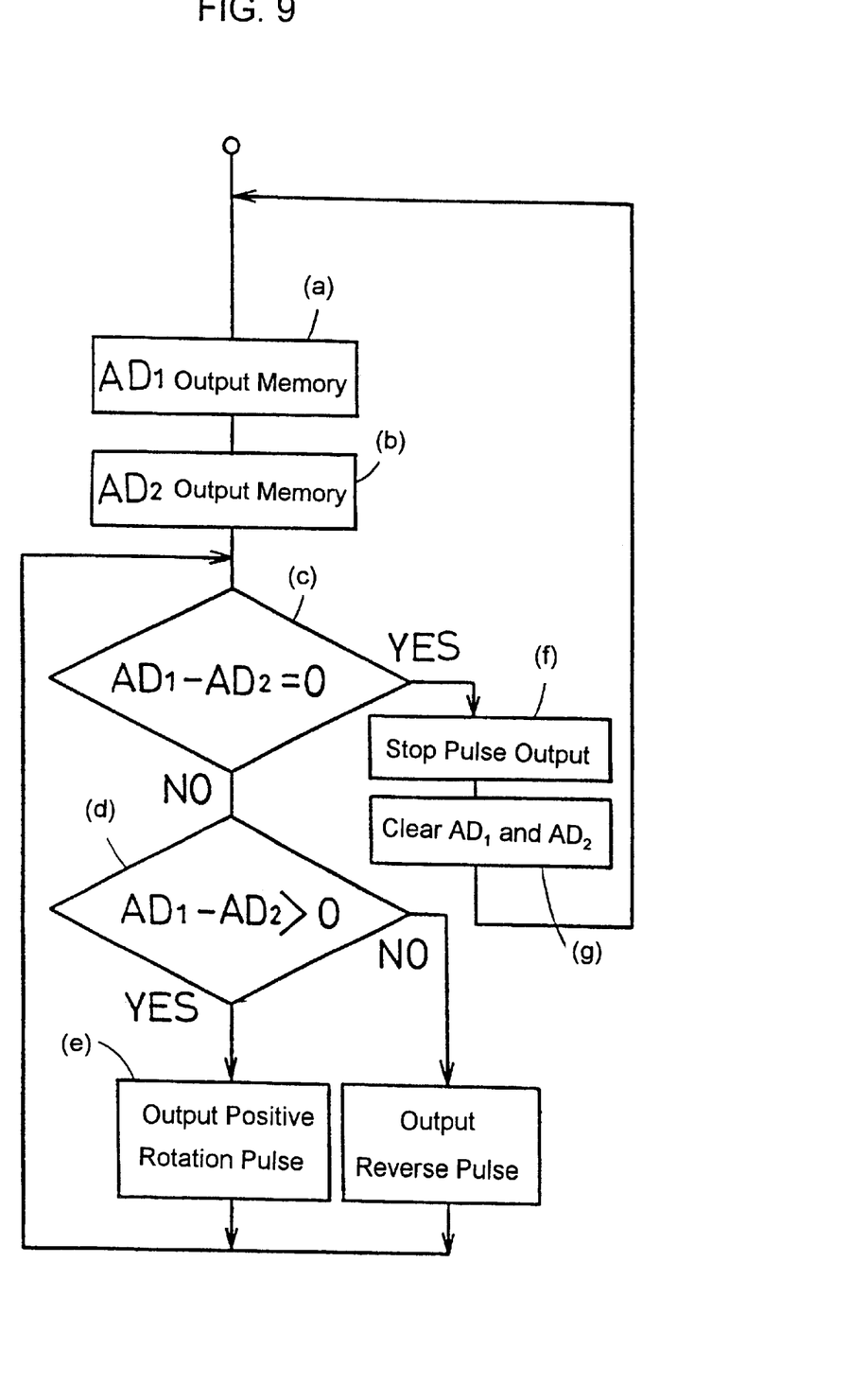
FIG. 9 is a flow chart showing an operation of the aforementioned modified embodiment.

The operation of the CPU 8 will be explained with reference to the flow chart shown in FIG. 9. The CPU 8 reads and saves the output of the converter AD1 (a). Next, the CPU 8 reads and saves the output of the converter AD2 (b). Next, it is judged whether the difference between the two stored data is zero (AD1−AD2=0?) (c). If the difference is not 0 (NO in Step (c)), the routine proceeds to (d), and it is judged whether (AD1−AD2) is larger than zero ((AD1−AD2)>0?). If YES, one positive rotation pulse is outputted to a motor M (e), and the routine returns to the step (c). If the operations (c)(d)(e)(c) . . . are performed in a cyclic manner, the motor M rotates in a positive direction until the equation (AD1−AD2)=0 at the step of (c) is satisfied (i.e., YES), then the operation returns to Step (a) via steps (f)(g). If NO in step (d), a reverse pulse is outputted, and an operation similar to the above is conducted. By these operations, the antenna AT rotates by the same angle as the rotational angle of the handle H in accordance with the rotation of the handle H.

This device includes the same displacement detectors at the input side of the displacement and the driven-side, and therefore has a feature that the relationship between the displacement and the output of the magnetic sensor 7 is not required to be linear. Furthermore, this device does not require a temperature correction means if there is no temperature difference between the input side and the driven side. This device may be a rotation type or a linear type as shown in FIG. 1. A structure utilizing the same displacement detectors at the input side and the driven side can be suitably applied to a manipulator or the like.

The aforementioned embodiments may be further simplified. In the simplified structure, the displacement detector P2 at the load side may be omitted, and the antenna AT may be directly connected to an axis of the gear G. A counter function is added to the CPU 8 so that it counts the number of pulses given to the motor by adding the positive rotation pulses given to the motor M and subtracting the reverse rotation pulses given to the motor M, and the CPU 8 saves the counted value. The CPU 8 outputs driving pulses to the motor M so that the saved counted value coincides with the output of the AD convertor AD1.

The present invention can also be applied to special usages other than the aforementioned usages. For example, the rotational displacement detector as shown in FIG. 4 may be used as a rotary encoder for inputting digitalized numerical signals of outputs. Since the device according to the present invention has an excellent angular resolution, it can easily obtain numeral signals having a digit number that is larger than a conventional mechanical or optical type rotary encoder.

Since the displacement detector according to the present invention has the structure mentioned above, the number of the structural parts is small, the device can be made at a low price. Furthermore, the device has less moving parts and the movement is simple. Therefore, there is no fear of an abrasion which occurs in a mechanical type, which results in a durable device. The device can detect a broad displacement including a linear displacement and an angular displacement, and can withstand a rough usage because of its impact-resistance. In addition, the device is simple in structure and light in weight, and can be small-sized.

What is claimed is:

1. A displacement detector, comprising:
    a permanent-magnet magnetic plate having a thickness which changes along a line on the surface of the magnetic plate, the magnetic plate being magnetized in its thickness direction;
    a magnetic sensor disposed near a surface of the magnetic plate so as to be movable in accordance with displacement of an object to be detected relative to the magnetic plate along the line on the magnetic plate while keeping a constant distance therebetween; and
    a drive mechanism for allowing a relative movement between the magnetic sensor and the magnetic plate, wherein the magnetic sensor outputs a detected signal corresponding to the displacement of the object.

2. The displacement detector as recited in claim 1, wherein
    the magnetic plate is ring-shaped.

3. The displacement detector as recited in claim 1, further comprising
    one or a plurality of magnetic temperature sensors fixed to the surface of the magnetic plate, and
    an arithmetic circuit, electrically coupled to the magnetic temperature sensors, which calculates a temperature correction, to correct the output of the magnetic sensor which is displaced relative to the magnetic plate and outputs a displacement detected signal, by utilizing the outputs of the magnetic temperature sensors.

4. The displacement detector as recited in claim 1, further comprising: one or a plurality of magnets disposed at any desired position apart from the magnetic plate and a magnetic sensor disposed near the magnet, wherein a temperature correction against the output of the magnetic sensor movable relative to the magnetic plate is performed by the output of the magnetic sensor.

5. The displacement detector as recited in claim 4, wherein
    two magnets are disposed apart from the magnetic plate, one of the two magnets having the same thickness as a thickness of the thinnest portion of the magnetic plate,
    the other having the same thickness as a thickness of the thickest portion of the magnetic plate, wherein
    two magnetic sensors are disposed so as to contact the magnets, respectively, and the displacement signal is given as a ratio of a difference between the outputs of the two magnetic sensors to a difference between the output of one of the two magnetic sensors and the output of the magnetic sensor which is displaced relative to the magnetic plate.

6. The displacement detector as recited in claim 4, wherein the magnetic sensor is disposed so as to contact one of the magnets disposed at any desired position apart from the magnetic plate, and a temperature correction value against the output of the magnetic sensor movable relative to the magnetic plate is obtained by comparing the output of the magnetic sensor with a reference value.

7. The displacement detector as recited in claim 1, further comprising a memory for storing an output signal of the magnetic sensor movable relative to the magnetic plate at a specified one or a plurality of positions, and an arithmetic circuit for converting the output of the magnetic sensor at any desired position into a displacement value corresponding to the position by utilizing the output signal stored in the memory and the displacement of the object.

8. The displacement sensor according to claim 1, wherein the line on the surface of the magnetic plate is straight.

9. The displacement sensor according to claim 1, wherein the magnetic sensor is disposed adjacent to the surface of the magnetic plate.

10. The displacement sensor according to claim 1, wherein the permanent-magnet magnetic plate further comprises an evenly-magnetized plate having a constant thickness adhered to a tapered plate.

11. The displacement sensor according to claim 1, wherein the line on the surface of the magnetic plate is circular.

* * * * *